H. A. COURMETTES.
BIFOCAL LENS AND METHOD FOR MAKING THE SAME.
APPLICATION FILED JULY 29, 1915.

1,160,383.

Patented Nov. 16, 1915.

WITNESSES:

Henry A. Courmettes
INVENTOR.

UNITED STATES PATENT OFFICE.

HENRY A. COURMETTES, OF NEW YORK, N. Y.

BIFOCAL LENS AND METHOD FOR MAKING THE SAME.

1,160,383.  Specification of Letters Patent.  Patented Nov. 16, 1915.

Application filed July 29, 1915. Serial No. 42,659.

*To all whom it may concern:*

Be it known that I, HENRY A. COURMETTES, a citizen of France, and a resident of the city of New York, borough of Brooklyn, in the county of Kings and State of New York, have invented an Improved Bifocal Lens and Method for Making the Same, of which the following is a full, clear, and exact description.

The objects of my invention are to correct the principal faults in the type of welded invisible bifocal lenses, namely:

1°. The fact that, owing to the deviation of the visual rays when passing through the peripheral part of the minor disk, two objects are seen in the same place when looking through the line of division between the upper and lower parts of the lens; thereby causing a confused vision and a source of grea discomgort to the wearer. In great many cases, this fault is responsible for the complete inability of persons to accustom themselves to this type of bifocals.

2°. The fact that the top portion of the minor disk possesses chromatic aberration of prism, due to the high dispersive power of said minor disk. This causes all objects looked at through that portion, to appear with colored edges, thereby blurring the vision.

I found that these faults could be corrected at the only condition, namely, that the line dividing the different refractive portions, should pass through the exact optical center of the minor lens.

The method consists essentially in filling the upper half of the recess in the major lens, with a glass similar in kind and refractive power, as that of said major lens; thereby perfectly neutralizing the said half and resulting in the finished lens as if no recess had been ground in that portion of the major lens; and filling the lower half of the recess with a glass of different refractive power than that of the major lens, thereby appearing in the finished lens as a half circle minor portion, the optical center of which being on the line dividing the bifocal surface.

Figure 1:
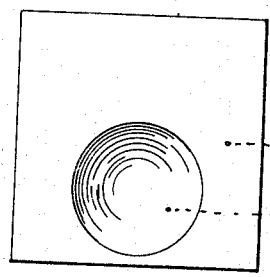
Figure 2:
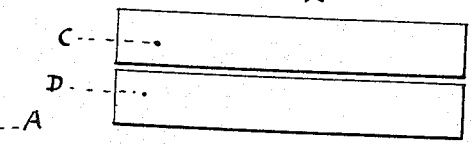
Figure 3:
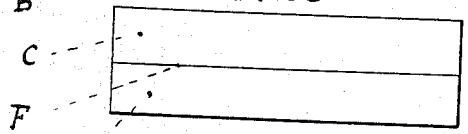
Figure 4:
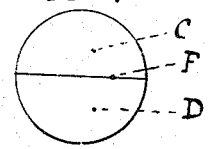
Figure 5:
Figure 6:
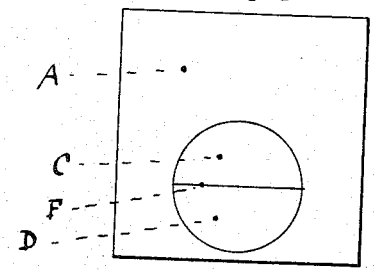
Figure 7:
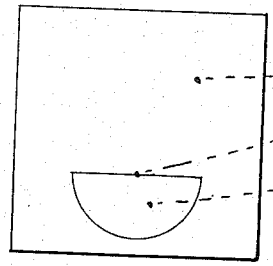
Figure 8:
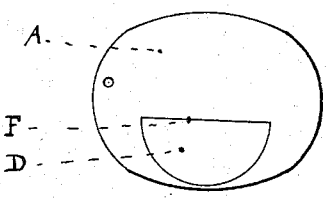
Figure 9:
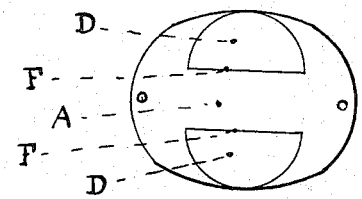

The method is further illustrated in the accompanying drawing, in which,

Figure 1 is a plan view of the major lens, showing the recess in which the composite minor lens is to be welded. Fig. 2 is a plan view of the two strips of different refractive glass, used in making the composite disk. Fig. 3 is a similar view after welding. Fig. 4 is a plan view of the composite disk cut out from the welded strips. Fig. 5 is a sectional view of the composite disk, showing the even curvature ground over the two different portions. Fig. 6 is a plan view of the major and minor lenses placed together and secured after welding. Fig. 7 is a plan view of the welded lens, with bifocal surface finished. Fig. 8 is a plan view of the finished lens. Fig. 9 is a plan view of a multifocal lens.

A major lens A having a recess or spherical curvature B ground and polished Fig. 1. A strip of low refractive glass C similar in kind and refractive power as that used in the major lens A and a strip of high refractive glass D Fig. 2 having one flat edge each ground and polished, are welded together so as to form a solid strip Fig. 3. A disk Fig. 4 cut out from the solid strip, and composed then of two exact half circles of glass welded at their adjacent edges F, is ground with a spherical curvature E Fig. 5, to fit the recess B of the major lens A. The composite disk is then placed in the recess of major lens Fig. 6 with the low refractive half C toward the upper part of the major lens; the whole, then subjected to heat until the composite disk or minor lens is thoroughly welded in the recess of major lens. The surface of the whole lens Fig. 7 having the disk welded unto, is then ground evenly flat or curved until the size wanted for the reading portion is attained and the surface is then polished. Finally the back surface of the major lens is ground and the bifocal lens is ready to be shaped as in Fig. 8. It is understood that multi-focal lenses as in Fig. 9 can be made by this method.

I am aware that a patent was granted to J. L. Borsch Jr. January 21 1908 #876,933 on welded bifocal lenses, but I am not aware that an embedded invisible bifocal lens having the optical center of the minor lens at the line of junction of the different refractive portions of said lens, was ever made, therefore,

I claim,

1. A homogeneous bifocal lens consisting of a major portion of glass and a minor portion embedded therein, the optical center of which being at the line of junction with the major portion of said lens as set forth.

2. An integral bifocal lens ground with even surfaces, consisting of a main body of glass and a minor lens embedded therein, said minor lens having its optical center at the line of junction of the different refractive portions of said lens as set forth.

3. An integral optical lens consisting of a main body of glass and a plurality of minor portions embedded therein, each of said minor portions having its optical center coinciding with a boundary line of the major portion of said lens as set forth.

4. In an integral bifocal lens consisting of a main body of glass and a minor lens embedded therein of different refractive powers as set forth, a half circle shaped minor lens, and having its optical center at the center of its straight edge as set forth.

5. The method of producing the bifocal lens as set forth, consisting in making a recess in a lens blank, filling and neutralizing one half of this recess with a glass or substance similar in refractive power to that of the lens blank, and filling the other half of said recess with a glass or substance of different refractive power, so that the line of junction of the different refractive portions passes through the optical center of the minor lens.

6. The method of producing the bifocal lens as set forth, consisting in making a recess in a lens blank, filling this recess by welding into it a disk composed of one part of glass of similar refractive power to that of lens blank and one part of glass of different refractive power, and surfacing the exposed bifocal surface until the minor lens is made semi-circular.

In testimony that I claim the foregoing as my invention I have hereunto signed my name this 27th day of July 1915.

HENRY A. COURMETTES.

In presence of—
Wm. F. Yenss,
Philip A. Beppler.